United States Patent
Mengwasser (10) Patent No.: US 12,021,716 B2
(45) Date of Patent: Jun. 25, 2024

(54) SYSTEMS AND METHODS FOR IMPLEMENTING DIGITAL TWIN WITH A LIVE STREAMING MAP

(71) Applicant: DISH Wireless L.L.C., Englewood, CO (US)

(72) Inventor: Brian Mengwasser, Denver, CO (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

(21) Appl. No.: 17/902,286

(22) Filed: Sep. 2, 2022

(65) Prior Publication Data

US 2023/0071899 A1     Mar. 9, 2023

Related U.S. Application Data (60) Provisional application No. 63/240,706, filed on Sep. 3, 2021.

(51) Int. Cl.
*H04L 12/26*     (2006.01)
*H04L 43/045*     (2022.01)
*H04L 43/065*     (2022.01)
*H04L 43/08*     (2022.01)

(52) U.S. Cl.
CPC ............ *H04L 43/08* (2013.01); *H04L 43/045* (2013.01); *H04L 43/065* (2013.01)

(58) Field of Classification Search
CPC .................. H04L 43/04–06; H04L 43/065
See application file for complete search history.

(56) References Cited

U.S. PATENT DOCUMENTS

| | | | |
|---|---|---|---|
| 10,547,521 B1 * | 1/2020 | Roy | H04L 41/0895 |
| 11,436,777 B1 * | 9/2022 | Karli | G06V 30/422 |
| 2003/0134631 A1 * | 7/2003 | Snyder | H04L 41/0816 455/425 |
| 2012/0120816 A1 * | 5/2012 | Garg | H04W 64/00 370/252 |
| 2014/0181934 A1 * | 6/2014 | Mayblum | H04L 67/306 726/7 |

(Continued)

FOREIGN PATENT DOCUMENTS

| | | |
|---|---|---|
| EP | 3128473 A1 | 2/2017 |
| WO | WO 2008156898 A2 | 12/2008 |

OTHER PUBLICATIONS

"Smarscape", Dynatrace.com (Year: 2019).*

(Continued)

*Primary Examiner* — Boris D Grijalva Lobos
(74) *Attorney, Agent, or Firm* — Seed Intellectual Property Law Group LLP (57) ABSTRACT

A digital twin system is able to provide a virtual representation of physical device and network infrastructure components in real-time. The digital twin system receives an indication of a user account associated with one or more devices associated with a network. The digital twin system identifies one or more network infrastructure components for the network which interact with the one or more devices associated with the user account. The digital twin system receives data describing the interaction of the devices with the network infrastructure components. The digital twin system causes the data describing the interaction of the devices to be displayed to a user.

18 Claims, 6 Drawing Sheets

(56) References Cited

U.S. PATENT DOCUMENTS

| | | | |
|---|---|---|---|
| 2015/0094104 A1* | 4/2015 | Wilmhoff | H01Q 19/10 |
| | | | 343/834 |
| 2015/0173022 A1* | 6/2015 | Black | H04W 4/029 |
| | | | 455/456.3 |
| 2016/0192151 A1* | 6/2016 | Marri Sridhar | H04W 4/20 |
| | | | 455/418 |
| 2017/0188309 A1* | 6/2017 | Black | H04W 64/00 |
| 2018/0341394 A1* | 11/2018 | Sangli | G06T 11/206 |
| 2020/0313923 A1 | 10/2020 | Choudhary et al. | |
| 2020/0382927 A1* | 12/2020 | Leduc | H04L 63/0823 |
| 2020/0413217 A1* | 12/2020 | Rothschild | H04W 4/026 |
| 2022/0150794 A1* | 5/2022 | Sparks | H04L 47/78 |
| 2022/0182785 A1* | 6/2022 | Edge | G01S 5/0269 |

OTHER PUBLICATIONS

ISR PCT/US2023/060777 (Year: 2023).*
International Search Report and Written Opinion, dated Nov. 30, 2022, for International Patent Application No. PCT/US2022/042495. (16 pages).

* cited by examiner

SYSTEMS AND METHODS FOR IMPLEMENTING DIGITAL TWIN WITH A LIVE STREAMING MAP

CROSS-REFERENCE TO RELATED APPLICATION(S)

This application claims the benefit and priority to U.S. Application No. 63/240,706, filed Sep. 3, 2021, the entirety of which is hereby incorporated by reference.

BACKGROUND

Subscribers to a network, such as a regional network, nationwide network, international network, telecom network, 4G/5G network, etc., typically analyze data regarding how their devices interact with the network. This data may include data describing quality of service provided to their devices, the data transmitted to and from their devices, network functions or attributes used by their devices, and other data related to device connectivity to the network. In order to obtain this data, subscribers, such as enterprise users, individual users, wholesale users, and other users of the network, typically use a variety of tools, such as coverage maps, invoices, tools to obtain performance statistics, tools to obtain outage reports, call detail records ("CDRs"), and other tools usable to obtain data regarding a device's interaction with a network (collectively "network data tools").

However, each of these network data tools may be separate tools which the subscriber must access individually. Furthermore, subscribers must also create their own custom network data analysis tools to analyze the data, perform functions such as bill reconciliation and service management, and perform other analysis or functions with the data. In order to use these tools and analyze how devices interact with the network the subscribers must dedicate time and resources to create data labs and replicas of the network technology. These data labs and replicas of the network are imprecise because they do not have access to the same level of data as the network owner, and are thus only used for support after issues escalate or quality of service for devices is severely negatively impacted.

It is with respect to these and other considerations that the embodiments described herein have been made.

BRIEF SUMMARY

Networks typically collect enormous quantities of data related to the devices connected to and interacting with network interface components which make up the network. However, the data collected by the network is typically not accessible to subscribers due to security concerns, among other reasons. Thus, subscribers must create their own tools which attempt to approximate the functions and data which are used and accessible by the network infrastructure components which are included in the network. These approximations require subscribers to dedicate large amounts of resources and time to create and maintain the tools. Thus, the tools developed by subscribers are unable to be used to accurately analyze the interaction of the subscribers' devices with the network. As a result, subscribers typically only use the tools for support after issues arise, when quality of service for devices are severely negatively impacted, etc.

The embodiments disclosed herein address the issues above and thus help solve the above technical problems and improve the technology of mobile networks and network infrastructure by providing a technical solution that provides access to the data collected by the network itself through digital twin technology through the use of a digital twin system. The embodiments disclosed herein are further able to receive an indication of a user account associated with one or more devices, each device of the one or more devices being associated with a network, identify one or more network infrastructure components for the network which interact with the one or more devices associated with the user account, receive data describing the interaction of the one or more devices with the network infrastructure components and cause the data describing the interaction of the one or more devices with the network infrastructure components to be displayed to a user. The data collected for each device may include one or more of: an indication of services provided by the network to the respective device; an indication of the type of data being used by the network to interact with the respective device; an indication of the quality of service for the respective device; an indication of a geospatial location of the device while it is connected to the network; and other data related to a device's interaction with the network.

In some embodiments, the digital twin system operates as part of, in conjunction with, etc., a distributed data platform. The digital twin system may obtain at least a portion of the data regarding a device's interaction with the network from the distributed data platform.

In some embodiments, the digital twin system is additionally able to display to a user a real-time location of the devices connected to the network. The digital twin system may display the real-time, or near-real-time, location of the devices on a map. The map may include one or more representations of network infrastructure components.

In some embodiments, the digital twin system is able to filter the data, such that data relevant to a subscriber is displayed to the subscriber. The digital twin system may filter the data by using one or more data filters. At least a portion of the data filters may be included in one or more widgets.

In some embodiments, the digital twin system determines whether at least one subset of the data is more relevant to the user than other subsets of the data. The digital twin system may make this determination based on one or more of: one or more devices of interest to the user; data which is relevant to one or more data filters; and one or more geographic areas of interest to the subscriber.

In some embodiments, the data is streamed from the network to the digital twin system in real-time. The data may be streamed from the network to the digital twin system may include data from an entity other than the subscriber or network (a "third party").

DETAILED DESCRIPTION

Networks typically collect enormous quantities of data related to the devices connected to and interacting with network interface components which make up the network. However, the data collected by the network is typically not accessible to subscribers due to security concerns, among other reasons. Thus, subscribers must create their own tools which attempt to approximate the functions and data which are used and accessible by the network infrastructure components which are included in the network. These approximations require subscribers to dedicate large amounts of resources and time to create and maintain the tools. Thus, the tools developed by subscribers are unable to be used to accurately analyze the interaction of the subscribers' devices with the network. As a result, subscribers typically only use the tools for support after issues arise, when quality of service for devices are severely negatively impacted, etc.

Furthermore, changes to aspects of the network, such as devices, network functions, network infrastructure components, or other aspects of the network associated with the network, may cause "breaking changes" to digital twin technology used by the network. A breaking change to digital twin technology, is a change in an aspect of the network which is not accurately represented in a digital twin, such that the digital twin does not accurately represent the state of the network. For example, in a system which tracks or manages 100 clusters, a portion of the clusters may be dark or otherwise unknown because they failed to properly update an inventory database. Such issues may be caused by traditional digital twins which use conventional push/pull database approaches for maintaining a digital twin.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
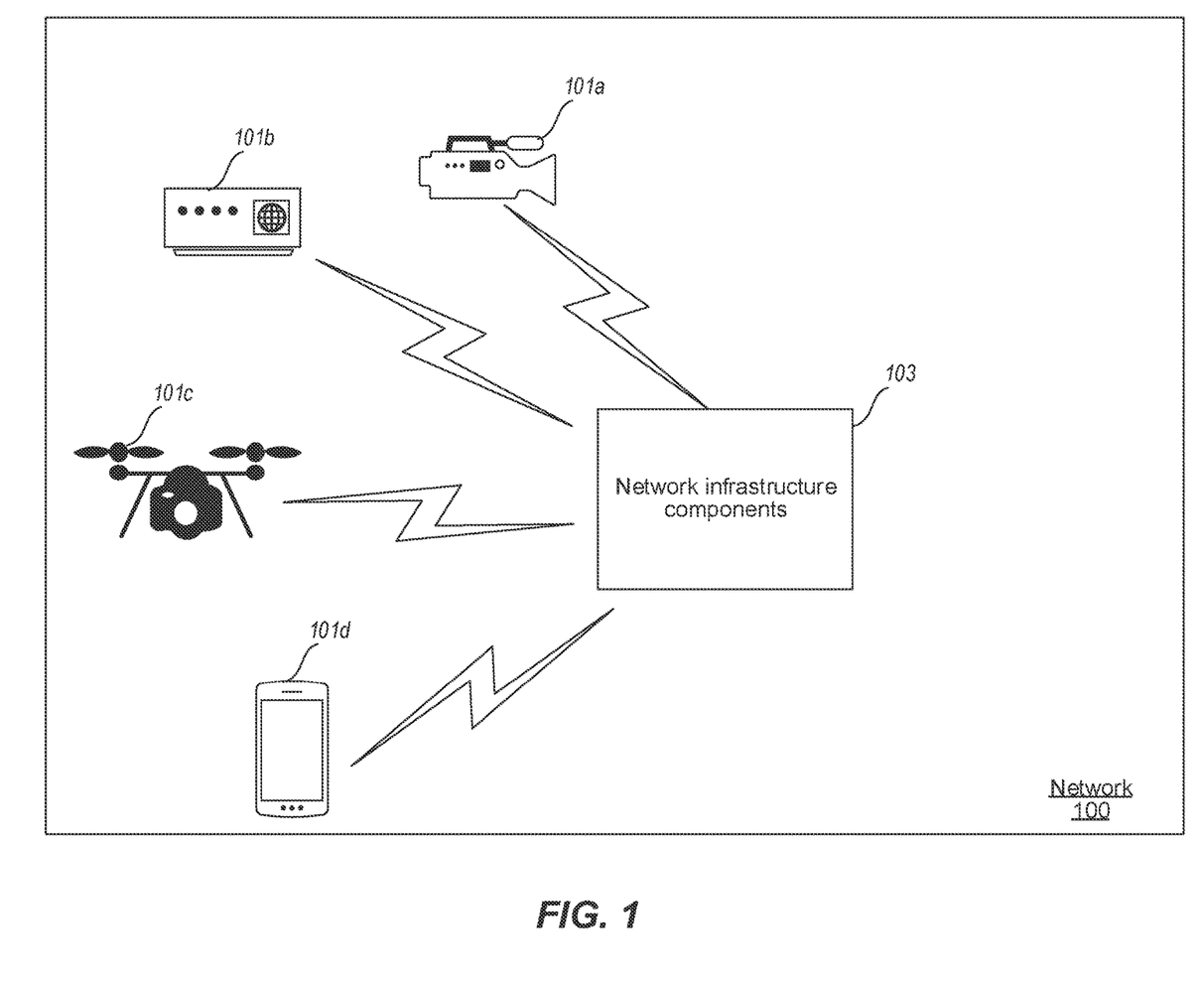
FIG. 1 is a display diagram showing an example network in which the digital twin system operates, according to various embodiments described herein.

FIG. 1 is a display diagram showing an example network 100 in which the digital twin system operates, according to various embodiments described herein. It is to be appreciated that FIG. 1 illustrates just one example of a network in which a digital twin system operates, and that various embodiments discussed herein are not limited to the use of such an environment. The network 100 includes one or more devices 101a-101d and network infrastructure components 103. The network infrastructure components 103 includes at least a portion of the network infrastructure components used by the network to provide service to the user devices 101a-101d. The network infrastructure components 101a-101d may include various components within a network infrastructure, such as towers, data centers, data lakes, third party components, e.g., customer devices operating on the network, including the local storage and computing capabilities of the customer devices, and other network infrastructure components which produce and consume data in the network.

The network 100 is a network, communication system, or networked system (not shown), to which the user devices 101a-101d, network infrastructure components 103, and network functions (not shown), may be coupled, and on which the user devices 101a-101d (collectively "user devices 101") operate. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. The user devices 101 may be one or more endpoint devices, such as PCs, tablets, laptop computers, smartphones, personal assistants, drones, Internet connection devices, wireless LAN, Wi-Fi, Worldwide Interoperability for Microwave Access (WiMax) devices, or the like, and may be communicatively coupled to the network or to each other so that the plurality of endpoint devices are communicatively coupled together. Thus, such a network enables the user devices 101a-101d, network infrastructure components 103, and network functions (not shown), used as part of the digital twin system, to communicate with each other.

Figure 2:
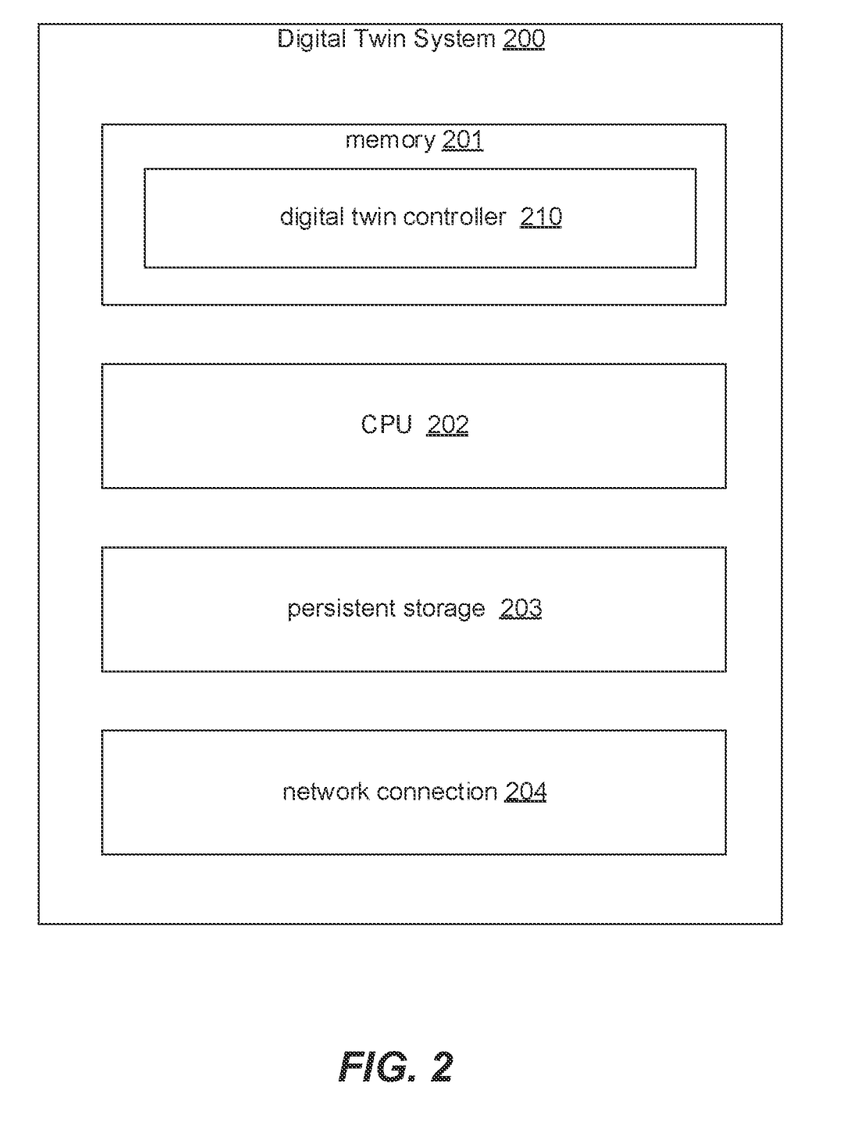
FIG. 2 is a block diagram depicting example components incorporated in a digital twin system, according to various embodiments described herein.

FIG. 2 is a block diagram depicting example computer components incorporated in a digital twin system, according to various embodiments described herein. The digital twin system 200 may be: located on the network 100 in a position to communicate with one or more network infrastructure components; integrated as part of one or more network infrastructure components; integrated as part of a plurality of network infrastructure components; or portions of the digital twin system may be integrated in a plurality of network infrastructure components. In various embodiments, the digital twin system 200 includes one or more of the following: a computer memory 201 for storing programs and data while they are being used, including data associated with the various network infrastructure components 103, user devices 101, and the digital twin system 200, an operating system including a kernel, and device drivers; a central processing unit (CPU) 202 for executing computer programs; a persistent storage device 203, such as a hard drive or flash drive for persistently storing programs and data; and a network connection 204 for connecting to one or more network infrastructure components or other computer systems, to send or receive data, such as via the Internet or another network and associated networking hardware, such as switches, routers, repeaters, electrical cables and optical fibers, light emitters and receivers, radio transmitters and receivers, and the like, and to scan for and retrieve signals from network infrastructure components, or other network functions, and for connecting to one or more computer devices such as network infrastructure components or other computer systems. In various embodiments, the digital twin system 200 additionally includes input and output devices, such as a keyboard, a mouse, display devices, etc.

While a digital twin system 200 configured as described may be used in some embodiments, in various other embodiments, the digital twin system 200 may be implemented using devices of various types and configurations, and having various computer components. The memory 201 may include a digital twin system controller 210 which contains computer-executable instructions that, when executed by the CPU 202, cause the digital twin system 200 to perform the operations and functions described herein. For example, the programs referenced above, which may be stored in computer memory 201, may include or be comprised of such computer-executable instructions. The memory 201 may also include a digital twin system data structure which includes data used by the digital twin system.

The digital twin system controller 210 performs the core functions of the digital twin system 200, as discussed herein and also with respect to FIGS. 3 through 6. In particular, the digital twin system controller 210 is able to make the data produced, consumed, stored, or otherwise used or accessible by a device which interacts with the network accessible to a subscriber. Additionally, the digital twin system controller 210 may cause a map to be displayed to a user which includes a representation of at least one user device based on a geospatial location of the user device. The digital twin system controller 210 may cause the displayed map to include a representation of one or more network infrastructure components based on a geospatial location of the one or more network infrastructure components. The digital twin system controller 210 may receive an indication of a filter to apply to the data, and may apply the filter to the data as part of causing the data to be displayed to the user. The digital twin system controller 210 may obtain data from a third party related to the device's interaction with the network and cause the data from the third party to be displayed to a user. The digital twin system controller 210 may additionally utilize one or more layers or widgets to allow a subscriber to customize the type of data obtained for the device's interactions with the network, the type of analysis performed on the data, etc.

In an example embodiment, the digital twin system controller 210 or computer-executable instructions stored on memory 201 of the digital twin system 200 are implemented using standard programming techniques. For example, the digital twin system controller 210 or computer-executable instructions stored on memory 201 of the digital twin system 200 may be implemented as a "native" executable running on CPU 202, along with one or more static or dynamic libraries. In other embodiments, the digital twin system controller 210 or computer-executable instructions stored on memory 201 of the digital twin system 200 may be implemented as instructions processed by a virtual machine that executes as some other program.

The embodiments described above may also use synchronous or asynchronous client-server computing techniques. However, the various computer components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented or performed by each computer component/module, and in different orders, and by different computer components/modules, yet still achieve the functions of the digital twin system 200.

In addition, programming interfaces to the data stored as part of the digital twin system controller 210 can be available by standard mechanisms such as through C, C++, C#, Java, and web APIs; libraries for accessing files, databases, or other data repositories; through scripting languages such as JavaScript and VBScript; or through Web servers, FTP servers, or other types of servers providing access to stored data. The digital twin system controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the computer components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each computer component/module, or existing functionality could be distributed amongst the computer components/modules in different ways, yet still achieve the functions of the digital twin system 200, user devices, and network infrastructure components.

Furthermore, in some embodiments, some or all of the computer components/portions of the digital twin system controller 210, or functionality provided by the computer-executable instructions stored on memory 201 of the digital twin system 200 may be implemented or provided in other manners, such as at least partially in firmware or hardware, including, but not limited to, one or more application-specific integrated circuits (ASICs), standard integrated circuits, controllers (e.g., by executing appropriate instructions, and including microcontrollers or embedded controllers), field-programmable gate arrays (FPGAs), complex programmable logic devices (CPLDs), and the like. Some or all of the system computer components or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

Figure 3:
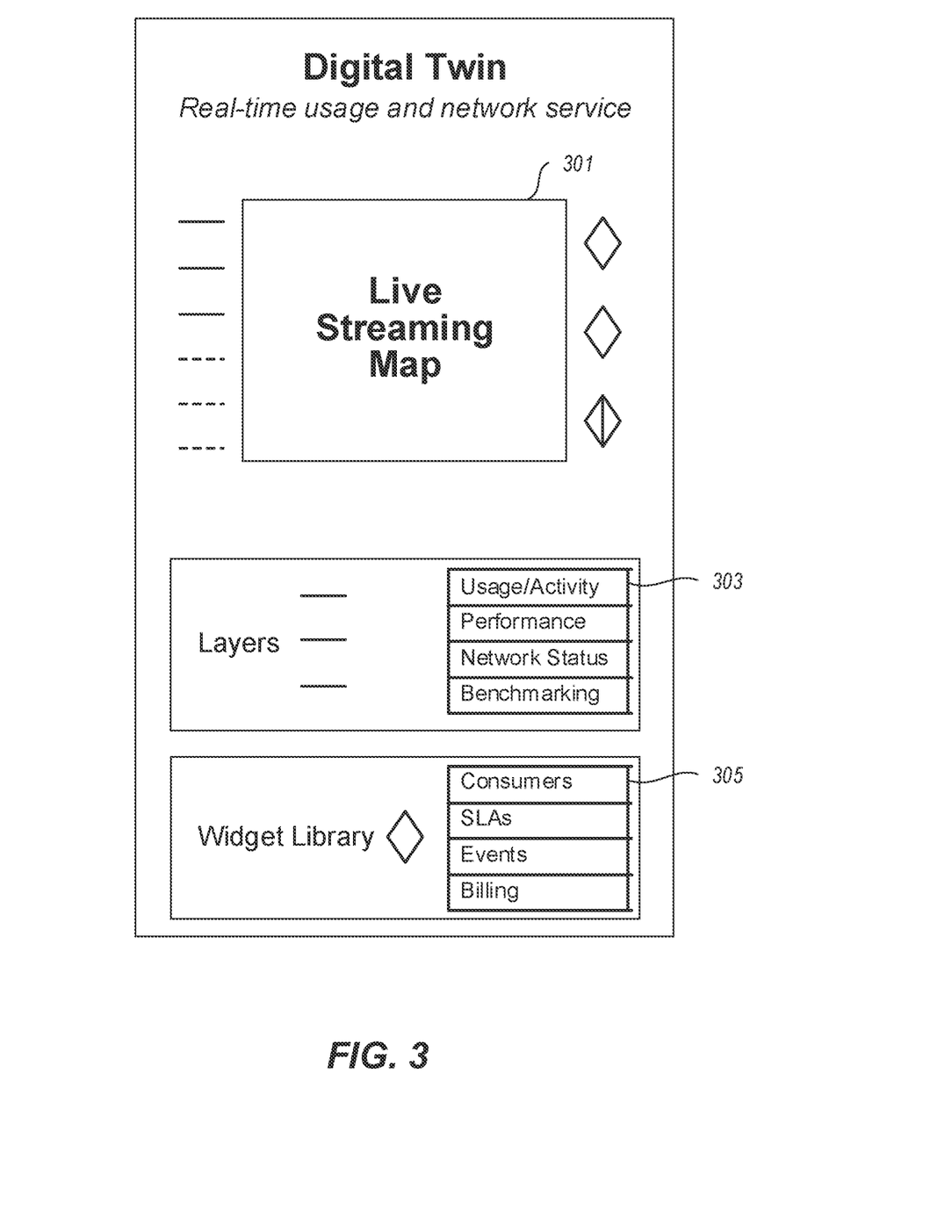
FIG. 3 is a display diagram depicting a display used by the digital twin system, according to various embodiments described herein.

FIG. 3 is a display diagram depicting a display used by the digital twin system, according to various embodiments described herein. The display may include a live streaming map 301, a layer control 303, and a widget control 305. The live streaming map 301 displays a map which includes a representation of at least one device interacting with a network. The device may be associated with a particular subscriber. The live streaming map 301 may additionally include other representations, such as a representation of points of interest, network infrastructure components, etc. The live streaming map 301 may be focused on, centered on, etc., a particular device or set of devices. The live streaming map 301 may additionally display data related to the devices, network infrastructure components, etc., which are displayed on the map. The live streaming map 301 may be display filtered data. The data may be filtered by layers defined in the layer control 303. The data may be filtered by widgets defined in the widget control 305.

The layer control 303 is used by a user to define and manage "layers" used by the digital twin system. Each layer represents a portion, or "layer," of the network, or of the device's interaction with the network at each portion of the network. Layers may include, among other things, network usage or activity, network performance, network status, device performance, benchmarking, etc. For example, the network state layer may provide data regarding cell towers in the area and whether they are functioning. A quality of service layer may provide data regarding the quality of service, such as whether the service in an area is degraded, normal, better than normal, etc. The layer control 303 may also include layers which are related to the device, or devices, of interest to the subscriber, such as a location of the device, how the device is interacting with the network, what services the device is using, what data is the device transmitting or receiving, what is the current quality of service provided to the device, etc. For example, the digital twin system is able to display data regarding which packets are being transmitted from the device, how fast the transmission is, how fast packets are being transmitted to the device, changes in the speed or quality of packet transmission, the type of content of the packets, and other data related to the data transmitted by the device.

The digital twin system is further able to combine the data obtained regarding the device's interaction with the network to create one or more "data metrics," such as, for example, a quality of service metric based on the device's ability to transmit and receive data. In some embodiments, the digital twin system is able to provide recommendations to a subscriber to define layers based on the type of data or devices the subscriber is interested in. The digital twin system may additionally filter the data used to create data metrics based on the type of data or devices the subscriber is interested in.

In some embodiments, layers additionally include data obtained from one or more third parties. The data obtained from one or more third parties may include: weather data, data from a competitor of a network owner, data requested by the subscriber, and other data not typically collected by a network.

In some embodiments, layers additionally include locations of interest specified by the subscriber.

The widget control 305 allows a user to define and manage "widgets" used by the digital twin system. The widgets define what types of statistical analysis is performed on the data obtained by the digital twin system. A subscriber may define their own widgets to provide analysis for a variety of data and objectives, such as: how the device performs in relation to other devices, analysis of the events experienced or triggered by the device, analysis of the effect to on the subscribers bill, analysis on service level agreements related to the device, and other analysis related to a device's interaction with a network.

In some embodiments, the digital twin system filters data as the data is received, based on a determination of which data is relevant to the subscriber. The digital twin system may determine which data is relevant based on the devices of interest to the subscriber, an indication of the subscriber of certain objectives or data types, the data required for the widgets, a geographic area of interest to the subscriber, etc. In some embodiments, the digital twin system displays the most relevant data first. For example, a first subset of the data may be more relevant to the user compared to a second subset of the data because the first subset of data may be obtained from one or more devices identified by the user as being of interest to the user, whereas the second subset of data may be obtained from one or more devices identified by the user as not being of interest to the user.

In some embodiments, the digital twin system searches for, finds, locates, or otherwise identifies network inventory or network topology. By operating in such a manner, the digital twin system may be used as a distributed active inventory system which is able to provide an accurate reconstruction of the network. Furthermore, such operations may be used by the digital twin system to identify, prevent, remedy, or otherwise resolve breaking changes to the digital twin system.

In some embodiments, as part of identifying the network inventory or topology, the digital twin system locates, finds, searches for, etc., data sources which may be relevant to the received data, device, network functions, network infrastructure components, or other aspects of the network. The digital twin system may "listen" to, track, receive data regarding, etc., various aspects of the network or devices, including source systems, to build correlation or relevancy graphs regarding the aspects of the network or device. A source system may be a system which generates, stores, receives, etc., data regarding such aspects of the network or devices. For example, the digital twin system may find data regarding a certain aspect of the network at one device or component associated with the network, and, based on the data regarding the certain aspect, determine that additional data regarding the certain aspect may be found at one or more other devices or components associated with the network.] By operating in this manner, such embodiments of the digital twin system ensure that data used by the digital twin system is accurate. Furthermore, such embodiments of the digital twin system are able to compile and provide access to an accurate representation of the data associated with the network in a manner that is more accurate than simply stitching or otherwise combining data sources.

In some embodiments, identifying the network inventory or topology enables the digital twin system to accurately track or identify devices, functions, network infrastructure components, or other aspects of the network or devices. By tracking such aspects of the network, the digital twin system maintains accurate data regarding each of the aspects of the network tracked by the digital twin system. For example, by operating in such a manner, embodiments of the digital twin system are able to prevent breaking changes to the digital twin system, which prevent the digital twin system from accurately representing the network. In an example embodiments, the digital twin system may prevent breaking changes by identifying whether a breaking change has occurred, such as by determining whether an aspect of the network has not been properly updated in the digital twin system. Based on such a determination, the digital twin system may access source system associated with the aspect of the network to obtain updated data regarding the aspect of the network.

In some embodiments, in addition to being able to model one or more devices associated with the network, the digital twin system is able to model one or more of: network functions, such as one or more services or micro-services; network virtualization, such as one or more network clusters; network routes or tunnels; cloud resources of the network; physical resources of the network, such as cabling or other network infrastructure components; PDU sessions maintained by the network; network policies or policy actions; network tests; network anomalies; or other aspects of the network which may be modeled by a digital twin system.

In some embodiments, the digital twin system provides an application programming interface ("API"), such as via queries, subscription to the digital twin system through message brokers, or other methods of accessing an API, to a user of the digital twin system. Such an API may be used by the digital twin system to provide visualization of various aspects of the network or devices associated with the network to a user device. Thus, although the embodiments herein describe a visualization of the aspects of the network or devices, the digital twin system is not required to provide such a visualization to a user device.

A primary benefit of this case is the Inventory and Topology using the digital twin as a distributed active inventory system. One aspects of this case is finding and tapping into the relevant data sources. This includes not only stitching together data from three databases and organizing into a digital twin, it also includes knowing which databases to look to in the first place, for example, in case there are an indeterminate/variable number of data bases, and doing so in a non-breaking manner. This can be done by obtaining information about various source systems, building correlation or relevancy graphs (e.g. if you see a reference to a purple elephant, there might be more relevant data about that elephant somewhere else) to ensure the digital twin is accurate and comprehensive, and, ultimately, to have confidence in the "Truth" of the digital twin.

Maintaining the "Truth" of the digital twin is one of the real fundamental problems of prior systems and the classic push/pull database approaches don't work well in this type of distributed system. Accordingly, in the present system, network functions (e.g. collections of micro-services), virtualization (e.g. k8s clusters), network routes/tunnels, cloud resources, physical resources (e.g. fiber optics), PDU sessions, network policies and policy actions, tests, anomalies, etc are things that should all be modeled to be able as part of the digital twin. This permits the system to maintain the "Truth" of the digital twin.

The present system therefore is constructed to have a non-breaking nature, which is very beneficial, especially if it comes to trigger downstream-systems in a closed loop manner.

Figure 4:
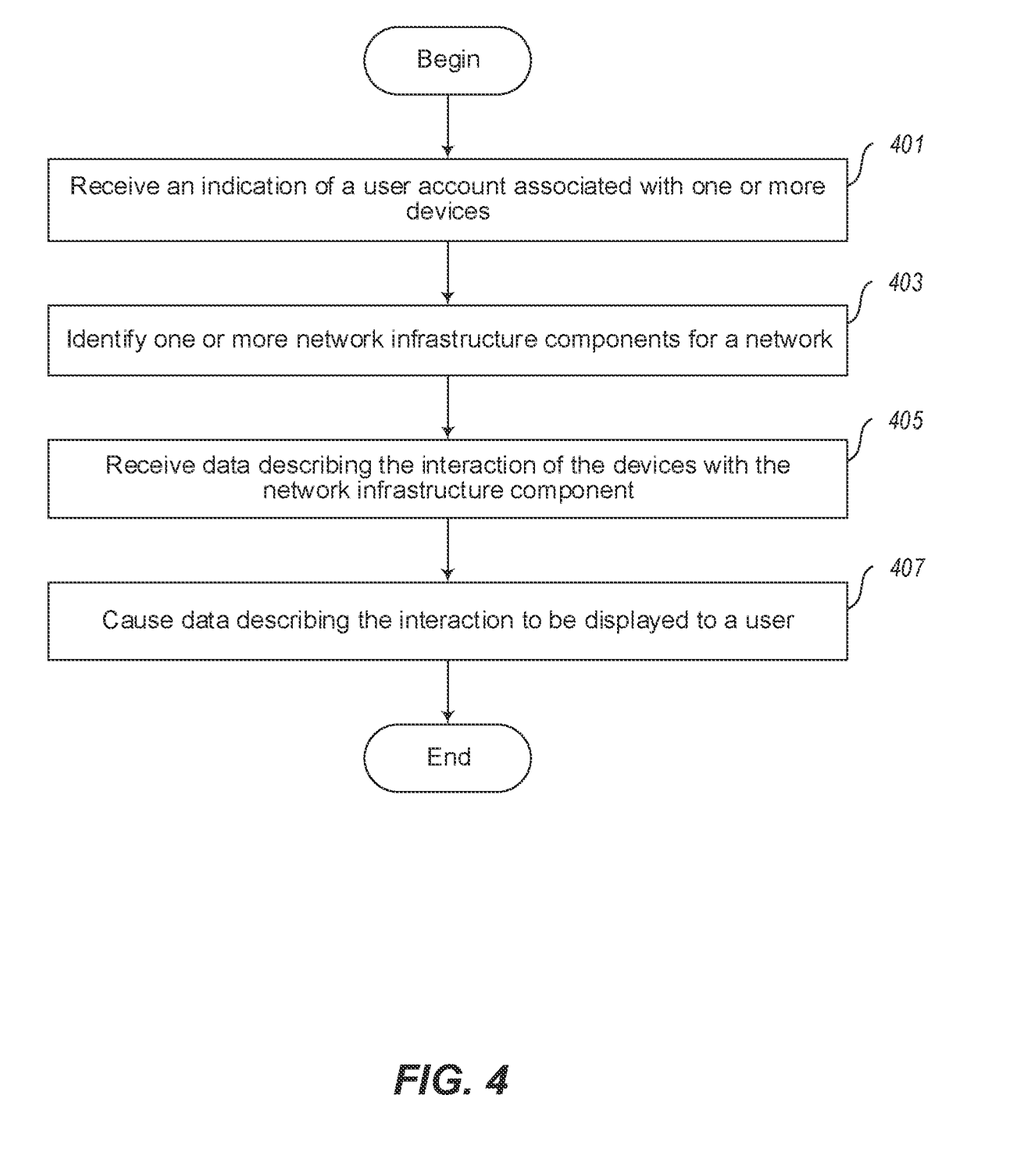
FIG. 4 is a flow diagram depicting a process to obtain data related to a device's interaction with a network, according to various embodiments described herein.

FIG. 4 is a flow diagram depicting a process to obtain data related to a device's interaction with a network, according to various embodiments described herein. At act 401, the digital twin system receives an indication of a subscriber account (or "user account") associated with one or more devices associated with a network.

At act 403, the digital twin system identifies one or more network infrastructure components for the network which interact with the devices associated with the user account. In some embodiments, the digital twin system identifies the one or more network infrastructure components based on one or more correlation or relevance graphs regarding aspects of the network or devices. The digital twin system may identify the network infrastructure components by identifying one or more source systems based to the data received or transmitted by the one or more devices.

At act 405, the digital twin system receives data describing the interaction of the devices with the network infrastructure components. In some embodiments, the data includes one or more of: an indication of services provided by the network to the respective device; an indication of the type of data being used by the network to interact with the respective device; an indication of the quality of service for the respective device; an indication of the data, the type of data, etc., being transmitted by the device; an indication of a geospatial location of the device; or other data which may be used by, used for, accessed by, etc., the device or network during the device's interaction with the network.

At act 407, the digital twin system causes the data describing the device's interaction with the network to be displayed to a user.

Figure 5:
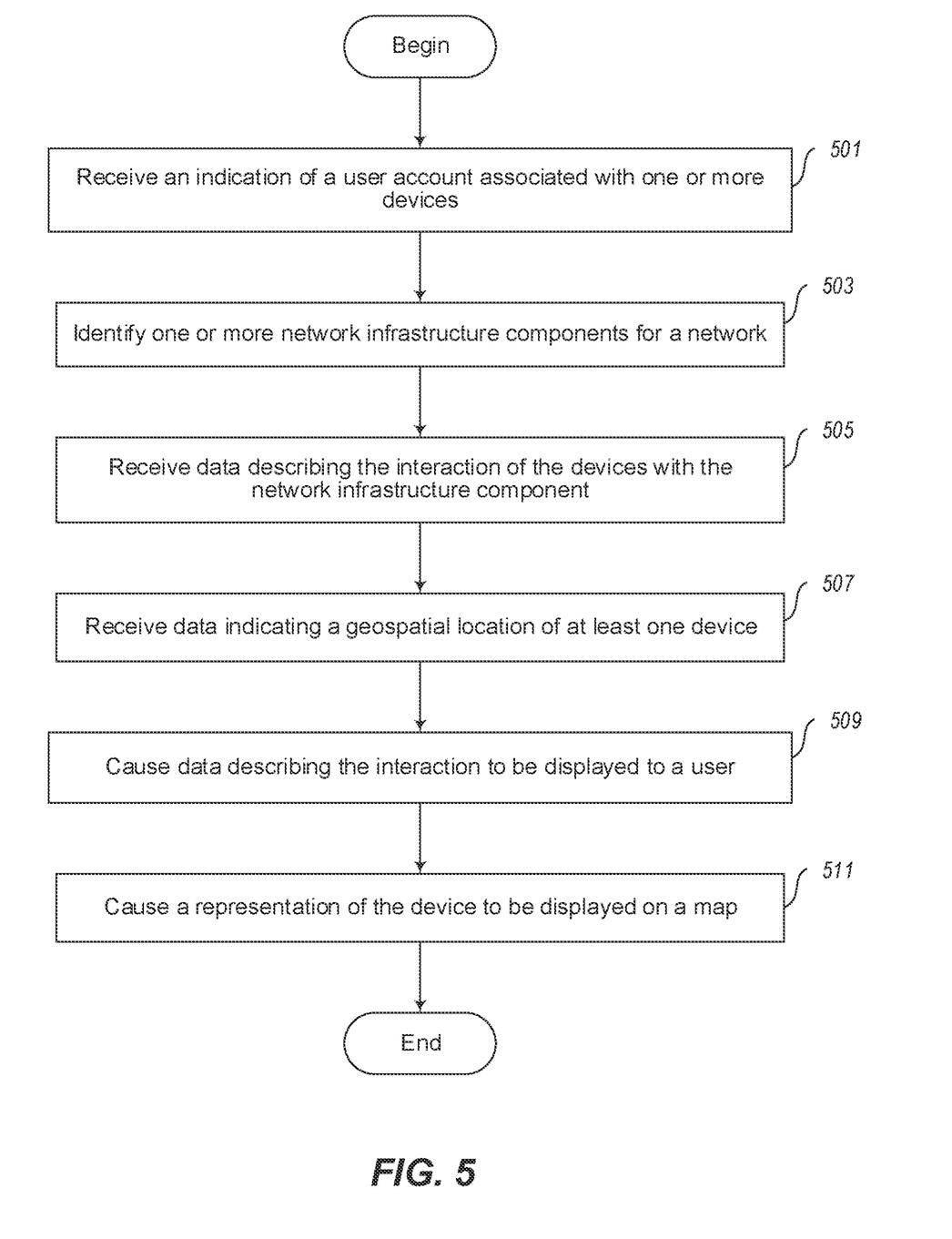
FIG. 5 is a flow diagram depicting a process to obtain data related to a device's interaction with a network and geospatial data for the device, according to various embodiments described herein.

FIG. 5 is a flow diagram depicting a process to obtain data related to a device's interaction with a network and geospatial data for the device, according to various embodiments described herein. Acts 501-505 proceed in a similar manner to acts 401-405. At act 507, the digital twin system receives data indicating the geospatial location of at least one of the devices associated with the user account. Act 509 proceeds in a similar manner to act 407.

At act 511, the digital twin system causes a map to be displayed to a user, and causes a representation of the device to be displayed on the map. The representation of the device may be displayed on the map in a manner which indicates the received geospatial location of the map. The map may include a representation of other user devices, network infrastructure components, points of interest, etc. The map may be updated in "real-time" as data is streamed to the digital twin system. The map may be focused on a geospatial area in which the device is located.

Figure 6:
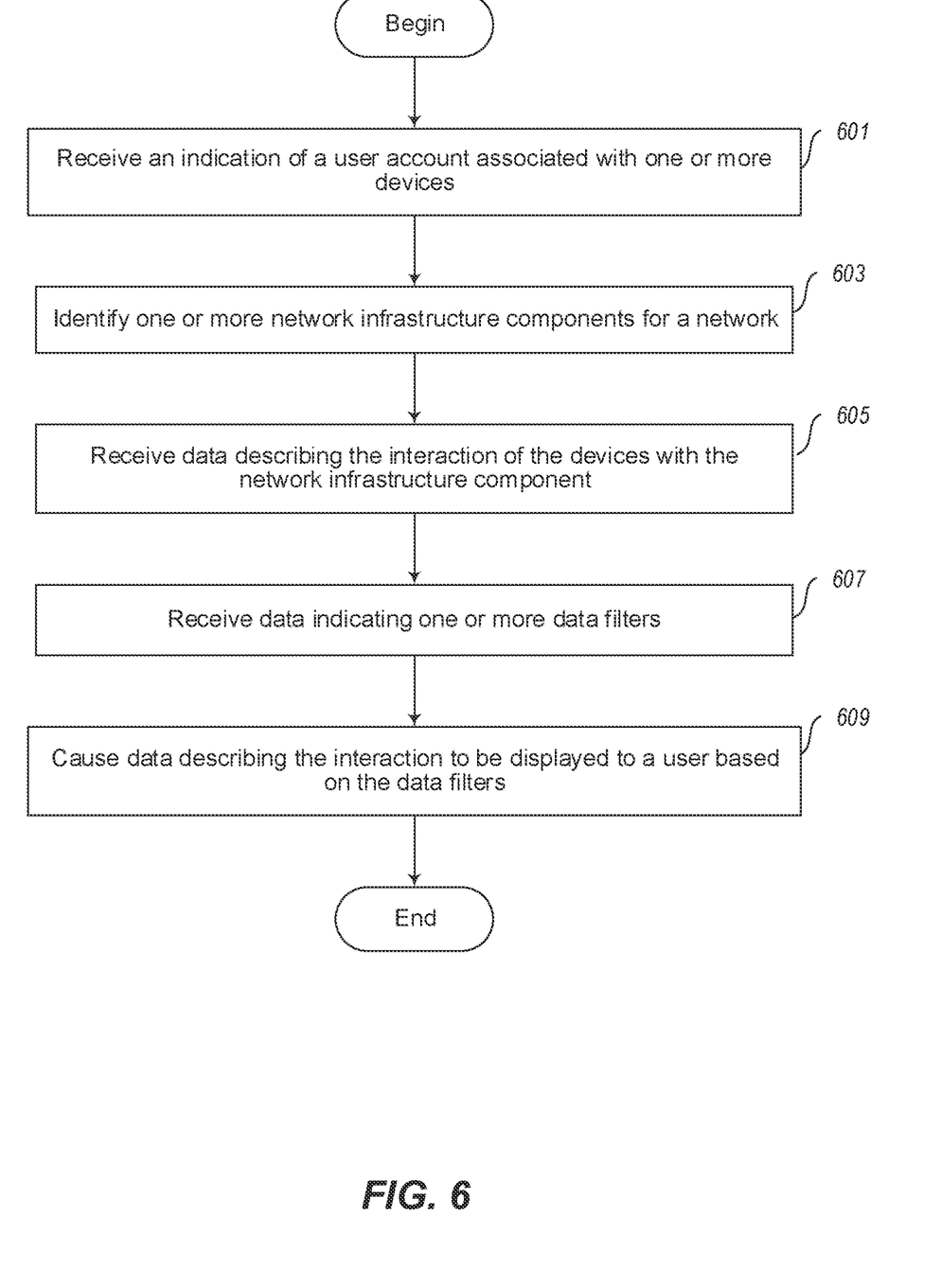
FIG. 6 is a flow diagram depicting a process to filter obtained data related to a device's interaction with a network, according to various embodiments described herein.

FIG. 6 is a flow diagram depicting a process to filter obtained data related to a device's interaction with a network, according to various embodiments described herein. Acts 601-605 proceed in a similar manner to acts 401-405. At act 607, the digital twin system receives data indicating one or more data filters. The data indicating one or more data filters may be configured by using layers or widgets, such as the layers and widgets described in FIG. 3. At act 609, the digital twin system filters the data obtained in act 605 based on the data filters obtained in act 607, and causes the filtered data to be displayed to a user.

In some embodiments, the digital twin system is able to provide real-time and interactive data visibility for network functions and services (collectively "delivered services") used by devices connected to the network. The digital twin system may additionally make it easier for wholesale or enterprise subscribers and their partners to monitor usage, performance, and network state data for their devices. The digital twin system may also provide a "single record of truth" and a backplane for service recommendations and improvements.

The digital twin system may have a variety of uses for a subscriber, some use case examples are: an executive customer-focused showcase of live services and differentiators;

a single-source of truth for incident diagnosis; a vendor partner self-service view for zero-impact network function upgrades; among a variety of other use cases.

In some embodiments, the digital twin system is able to provide a near-real-time geospatial view of delivered services. The digital twin system may be able to provide a near-real-time statistical view of data related to delivered services. The digital twin system may provide a separate display, or view, for users other than the subscriber, such as customers or partners of the subscriber.

In some embodiments, the digital twin system is able to provide data used to assess the interactivity between devices, network infrastructure components, and other elements of the network. The digital twin system may provide data related to customer usage of the network, competitive benchmarking of network systems and functions, network state and network performance, and other data related to devices and their interaction with a network.

In some embodiments, the digital twin system provides one or more of: enterprise on-prem views, projected usage and performance, augmented or virtual reality, or recommendations to improve or change a device's interaction with the network.

Thus, by performing the functions described above, the digital twin system is able to provide a near-real-time representation about the physical and virtual elements of the network. In some embodiments, as part of providing this representation, the digital twin system includes a model of an area of interest for a subscriber, such as a two-dimensional model, three-dimensional model, etc. The digital twin system may use one or more of augmented reality or virtual reality to display a representation of objects on the model. Additionally, the digital twin system is thus able to provide a representation of the physical devices and infrastructure as a virtual construct in real-time. The digital twin system is then able to provide this representation in a machine-readable form, or to provide the data to a user in human-readable form.

The various embodiments described above can be combined to provide further embodiments. All of the U.S. patents, U.S. patent application publications, U.S. patent applications, foreign patents, foreign patent applications and non-patent publications referred to in this specification or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   at least one processor; and
   at least one memory coupled to the at least one processor, the memory having computer-executable instructions stored thereon that, when executed by the at least one processor, cause the system to:
   electronically receive an indication of a user account associated with one or more devices, each device of the one or more devices being associated with a network;
   electronically identify one or more network infrastructure components for the network that interact with the one or more devices associated with the user account;
   electronically receive data describing interactions of the one or more devices with the one or more network infrastructure components, the data including one or more of:
      an indication of services provided by the network to the respective one or more devices; or
      an indication of the type of data used by the network to interact with the one or more devices; and
   electronically cause the data describing the interaction of the one or more devices with the one or more network infrastructure components to be displayed to a user.

2. The system of claim 1, wherein the computer-executable instructions, when executed by the at least one processor to electronically receive the data describing the interactions of the one or more devices with the one or more network infrastructure components, further cause the system to:
   electronically receive data describing a geospatial location of a respective device of the one or more devices.

3. The system of claim 2, wherein the computer-executable instructions, when executed by the at least one processor to electronically cause the data describing the interaction of the one or more devices to be displayed to the user, further cause the system to:
   electronically cause a map to be displayed to the user;
   electronically determine where to place a representation of at least one device of the one or more devices on the displayed map based on the data describing the geospatial location of the respective device; and
   electronically cause the map to display the representation of the at least one device based on the determination of where to place the at least one device on the displayed map.

4. The system of claim 1, the computer-executable instructions, when executed by the at least one processor to electronically cause the data describing the interactions of the one or more devices with the network infrastructure components to be displayed, further cause the system to:
   electronically receive user input indicating one or more data filters; and
   electronically cause the data describing the interactions of one or more devices with the network infrastructure components to be displayed to the user based on the one or more data filters.

5. The system of claim 4, wherein the computer-executable instructions, when executed by the at least one processor to electronically receive the user input indicating the one or more data filters, further cause the system to:
   electronically receive user input identifying one or more widgets, each widget including at least one data filter.

6. The system of claim 1, wherein the computer-executable instructions, when executed by the at least one processor to electronically receive the data describing the interactions of the one or more devices with the one or more network infrastructure components, further cause the system to:
   electronically receive an indication of services provided by the network to a respective device of the one or more devices;
   electronically receive an indication of a type of data being used by the network to interact with the respective device of the one or more devices; and electronically receive an indication of a quality of service for the respective device of the one or more devices.

7. A method for operating a digital twin system, the method comprising:

receiving an indication of a user account associated with one or more devices, each device of the one or more devices being associated with a network;

identifying one or more network infrastructure components for the network that interact with the one or more devices associated with the user account;

receiving data describing interactions of the one or more devices with the one or more network infrastructure components, the data including one or more of:

an indication of services provided by the network to the respective one or more devices; or an indication of the type of data used by the network to interact with the one or more devices; and causing the data describing the interaction of the one or more devices with the network infrastructure components to be displayed to a user associated with the user account.

8. The method of claim 7, wherein receiving the data describing the interaction of the one or more devices with the network infrastructure components further comprises:

receiving data describing a geospatial location of a respective device of the one or more devices.

9. The method of claim 8, wherein causing the data describing the interaction of the one or more devices to be displayed to the user further comprises:

causing a map to be displayed to the user;

determining where to place a representation of at least one device of the one or more devices on the displayed map based on the data describing the geospatial location of the respective device; and causing the map to display the representation of the at least one device based on the determination of where to place the at least one device on the displayed map.

10. The method of claim 7, wherein causing the data describing the interaction of the one or more devices with the network infrastructure components to be displayed further comprises:

receiving user input indicating one or more data filters; and causing the data describing the interactions of one or more devices with the network infrastructure components to be displayed to the user based on the one or more data filters.

11. The method of claim 10, wherein receiving user input indicating one or more data filters further comprises:

receiving user input identifying one or more widgets, each widget including at least one data filter.

12. The method of claim 7, wherein causing the data describing the interaction of the one or more devices to be displayed to the user further comprises:

determining whether at least one subset of the data is more relevant to the user than other subsets of the data, based on one or more of:

one or more devices of interest to the user;

an indication of data relevant to one or more data filters; and one or more geographic areas of interest to the user.

13. The method of claim 7, wherein receiving the data for each device of the one or more devices, further comprises:

receiving an indication of the quality of service for the respective device.

14. A non-transitory processor-readable storage medium that stores at least one of instructions or data, the instructions or data, when executed by at least one processor, cause the at least one processor to:

receive an indication of a user account associated with one or more devices, each device of the one or more devices being associated with a network;

identify one or more network infrastructure components for the network that interact with the one or more devices associated with the user account;

receive data describing interactions of the one or more devices with the one or more network infrastructure components, the data including one or more of:

an indication of services provided by the network to the respective one or more devices; or an indication of the type of data used by the network to interact with the one or more devices; and cause the data describing the interaction of the one or more devices with the one or more network infrastructure components to be displayed to a user.

15. The non-transitory processor-readable storage medium of claim 14, wherein receiving the data describing the interaction of the one or more devices with the network infrastructure components further comprises:

receiving data describing a geospatial location of a respective device.

16. The non-transitory processor-readable storage medium of claim 15, wherein to cause the data describing the interaction of the one or more devices to be displayed to the user, the instructions or data further cause the at least one processor to:

cause a map to be displayed to the user;

determine where to place a representation of at least one device of the one or more devices on the displayed map based on the data describing the geospatial location of the respective device; and cause the map to display the representation of the at least one device based on the determination of where to place the at least one device on the displayed map.

17. The non-transitory processor-readable storage medium of claim 14, wherein to cause the data describing the interactions of the one or more devices with the network infrastructure components to be displayed, the instructions or data further cause the at least one processor to:

receive user input indicating one or more data filters; and cause the data describing the interactions of one or more devices with the network infrastructure components to be displayed to the user based on the one or more data filters.

18. The non-transitory processor-readable storage medium of claim 17, wherein to receive user input indicating one or more data filters, the instructions or data further cause the at least one processor to:

receive user input identifying one or more widgets, each widget including at least one data filter.

* * * * *